Figure 1:
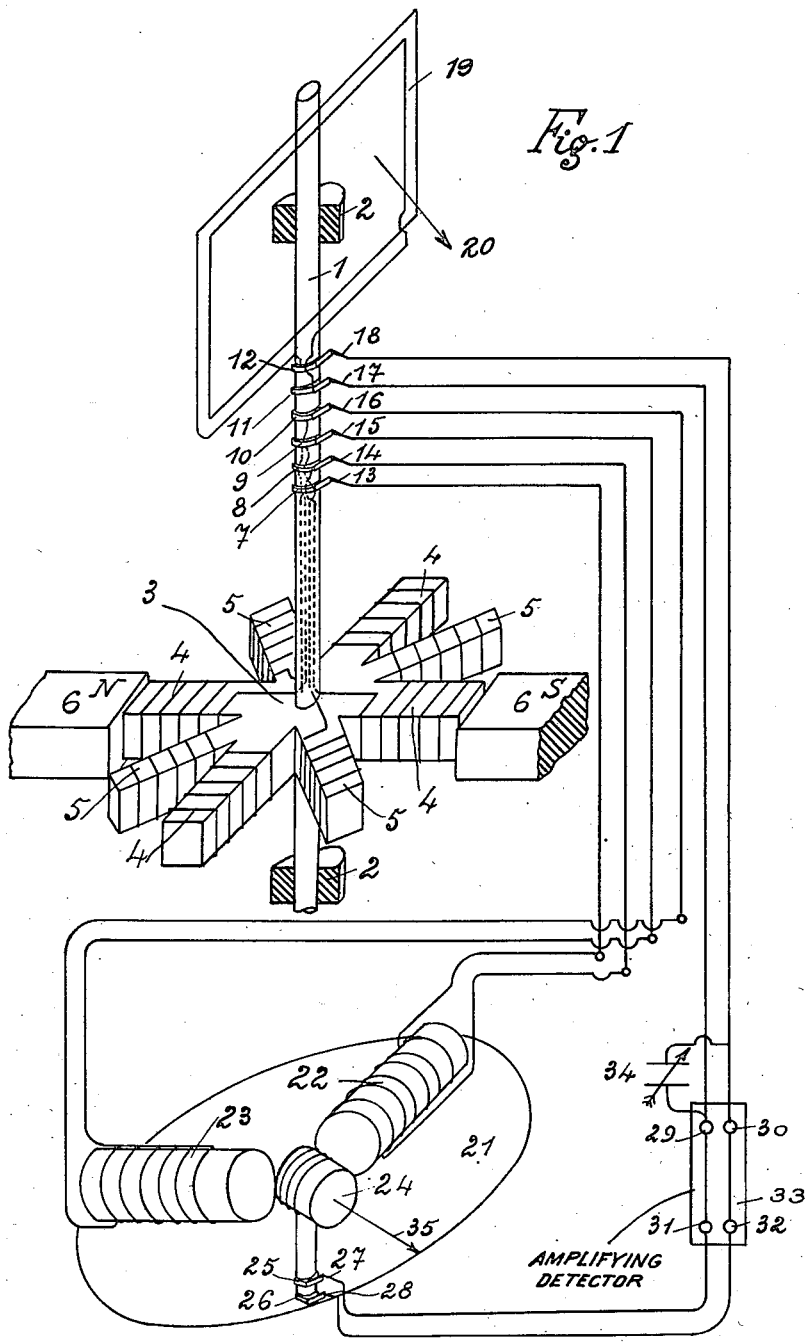

Feb. 9, 1932.  L. LEVY  1,844,859

MAGNETIC AND RADIOELECTRIC GONIOMETRY

Filed April 1, 1927  2 Sheets-Sheet 1

Feb. 9, 1932.  L. LEVY  1,844,859
MAGNETIC AND RADIOELECTRIC GONIOMETRY
Filed April 1, 1927  2 Sheets-Sheet 2

*Fig. 2*

Patented Feb. 9, 1932

1,844,859

UNITED STATES PATENT OFFICE

LUCIEN LEVY, OF PARIS, FRANCE

MAGNETIC AND RADIOELECTRIC GONIOMETRY

Application filed April 1, 1927, Serial No. 180,319, and in France April 3, 1926.

My invention relates to a method for giving the indication of an angle from a distance and more particularly to give the indication from a distance of the direction of a magnetic field of constant or varying strength and direction. It provides also for the application of said method to aviation for the purpose of measuring the height of an airship above the ground.

It is well known that being given for example an alternating magnetic circuit its direction may be located by causing it to act upon two perpendicular frames and by comparing the strength of both secondary currents for instance in a goniometer. It is evident that in order to make the comparison a logometer may be substituted for the radiogoniometer, the effective direction of the field being obtained by means of an index. As the currents induced in the frames are generally excessively weak, it is necessary to amplify them before sending them through the logometer. Now these currents being generally of unequal strength it is practically impossible to amplify them uniformly and consequently the angles indicated by the elementary device above mentioned are not exact.

My invention has for its object a system for indicating from a distance the angle of a magnetic field in which these defects are avoided and it relates to an apparatus which allows by means of a moving index to indicate the direction of a continuous or alternating magnetic field. This apparatus can in fact be assimilated to an electrodynamic compass.

The system according to my invention is based upon the registering by comparison of the field of which the direction is to be determined with an auxiliary field constituting for instance the stator of a multiphase generator. The comparison will be easily effected by comparing the relative phases of the electromotive forces of the current generator with the electromotive force proceeding directly or not from the various exploring elements of the unknown field. This comparison will take place for example in an electrodynamic phasemeter provided with an index, which may be directly graduated in degrees or graduations in order to allow of reading the direction of the magnetic field from a fixed direction taken as starting point.

The appended drawings show by way of example two modes of execution of my invention.

Fig. 1 is a diagram of the arrangement according to the first mode of execution. Fig. 2 is a diagram of a second mode of execution of the invention using a fixed aerial receiver.

As will be seen in this figure, upon a vertical spindle 1 rotating in bearings 2 are mounted a tetrapolar two-phase induction rotor 3 placed in the horizontal magnetic field 6 constituting the inductive stator of a tetrapolar two-phase alternator, and a frame 19 having one or several windings acted upon by the magnetic field 20 of which it is desired to know the direction.

The spools 4, 5 which constitute respectively each of the two rotor windings are connected respectively to the rings 7, 8, 9 and 10, and the frame 19 is connected to the rings 11, 12. The stationary brushes 13, 14, 15, 16, 17, 18 collect the armature voltage and are connected to the various circuits of the phasemeter 21. The latter comprises three windings 22, 23, 24 of which the respective spindles are placed in the same horizontal plane. The axes of the windings 22 and 23 are perpendicular to each other and the winding 24 can rotate around a vertical spindle passing through the point of junction of said axes. The winding 24 is provided with an index moving in front of a graduation indicating the angles.

The winding 24 is connected to the rings 25, 26 and consequently with the stationary brushes 27, 28 connected themselves with the leading-out terminals 31, 32 of an amplifying detecting device 33 the leading-in terminals of which 29, 30 are connected to the brushes 17, 18. The windings 22, 23 are respectively connected to the brushes 13, 14 and 15, 16.

The mode of operation is as follows:—

Supposing a high frequency alternating field 20. In that case the frame is preferably tuned on the wave to be received by means of the condenser 34. The effect of the rotation of the frame causes a modification of the receiving intensity at the station and consequently the modulation of the high frequency current induced in the frame. Owing to the high frequency of the field the dynamic action due to the rotation of the frame in the field may be passed over.

The detecting amplifier 33 amplifies in high frequency the currents induced in the frame and the detector emits a current having a low frequency which is equal to twice the number of revolutions of the frame spindle per second and which reaches the highest point every time that the frame is perpendicular to the field to be registered.

The alternator being tetrapolar gives a two-phase current of the same frequency as the detector, that is to say equal to double the number of turns of the axis of the frame of which the phase is bound to the position of the rotor and consequently of the frame in space.

Consequently an equilibrated position of the winding 24 corresponds to every direction of the emission and therefore the index 35 can point out this direction upon a dial.

As there is sometimes a certain difficulty in imparting to the receiver a rotary motion having a sufficient speed, a second mode of execution has been devised which comprises a stationary aerial frame as shown in Fig. 2. 36, 37 Fig. 2, are two vertical perpendicular frames, having the same self resistance and 38, 39 are two tuning condensers which are preferably mechanically connected.

The vacuum tubes 40, 41 having three electrodes are provided with filaments $40^a$, $41^a$, with grids $40^b$, $41^b$ and places $40^c$, $41^c$.

The plate-circuits are fed by the battery 42 and by the two di-phase alternators 43 $\sin \Omega t$, and 44 $\cos \Omega t$ having a pulsation $\Omega$ which can correspond to audible or inaudible frequencies. The same tensions 43, 44 feed the windings 22, 23 of the phasemeter.

The high frequency transformers 45, 46 and 47, 48 are placed in the plate-filament circuits of the tubes 40, 41 the secondary circuits 46, 48 of said transformers are in series and give out the current on the detecting amplifier 29, 30, 31, 32 which gives out at 31, 32, currents having the modulating frequency.

The mode of operation of the arrangement which has just been described is as follows:

The two perpendicular frames 36, 37 and the two vacuum tubes 40, 41, considered as a whole take the place of the rotary frame shown in Fig. 1. In fact, if H. sin. cot. designate the altering field H. F.

α the angle of said field

K a constant the tensions at the terminals of the frames are:

K. H. sin. cot = sin α
K. H. sin cot − cos α the tensions H. F. at 45, 47 are:

K. H. sin cot sin α sin $\Omega t$.
K. H. sin cot cos α cos $\Omega t$.

The tension at 29, 30 is:

K. H. sin cot sin ($\Omega t - α$)

It will thus be seen that the tension 29, 30 as in the case of the rotary frame, is a high frequency tension modulated at the frequency $\Omega$. Moreover, the phase displacement of the modulating frequency on sin $\Omega$ measures the angle of inclination α of the magnetic field on the position of the frame, it will therefore be possible as in the preceding arrangement to graduate the movements of the index 35 in function of the direction of the sending station.

It will be noted that in the phasemeter the winding 24 could be rendered stationary and that the two perpendicular windings 22, 23 taken as a whole could rotate upon a spindle. In that case the index would be moved by the displacements of the windings 22, 23.

In the case of a constant magnetic field it is preferable to use the device shown in Fig. 1, but in that case the dynamic electromotive force due to rotation will act alone and it must be noted that the position of the exciting field is in that case at 90° in space relatively to the position of the frame which gives the highest electromotive force. This being taken into account the graduation of the phasemeter as to direction will not offer any difficulty. Consequently the position of the index 35 follows at a distance every change of direction of the constant or alternating field 20.

It will be understood that my invention allows the repetition of commands or signals from a distance or of keeping up a synchronism of any desired frequency it will be sufficient to change the direction of a magnetic field 20 created either locally by means of an electromagnet or a solenoid, or at distance by means of Hertzian waves. It must also be noted that said fields may be created at distance by the radiation of horizontal or of rotary fields.

It is to be remarked that in the case of various applications radioelectric connections may be substituted for some of the electric connections shown in Figs. 1 and 2.

In the case of torpedoes, or moving bodies to be steered from a distance by wireless electric waves the point aimed at will be surely reached. It is well known that in order to prevent the moving body from being steered the enemy is obliged to send forth confusing waves having the same frequency as the steering waves. It will be sufficient in the case of a powerful confusing wave to provide the torpedo with an electromagnetic compass provided with relays which steer the moving body exactly towards the confusing station.

Generally speaking the electromagnetic compass provided with a contact allows of automatically steering towards a predetermined sending station and consequently it may be very serviceable in aviation, for steering in a horizontal as well as in a vertical plane.

For this last mentioned application the airship is provided with a special emitter radiating an electric field circularly polarized or rotating at high frequency and that in a horizontal plane.

The Hertzian waves sent forth by the said emitter are reflected on the ground and are received by the special goniometer previously described. The emitter sends forth for instance waves having a length of 25 m. rotating at high frequency ($10^6$ revolutions per second) and both the emitter and the receiver are placed in such a position that the emitter never acts directly upon the receiver. The emitter may be provided with two perpendicular horizontal aerials fed by two sending tubes of which the plate grid tensions are in sinus and cosinus, and the receiving apparatus may be provided with two frames connected with two vacuum tubes having their plate tensions in sinus and cosinus as shown in Fig. 2.

It will be easily understood that the wave sent forth at a given instant is never received by the receiving apparatus and that the latter is affected only by the reflected wave which comes with sufficient delay to allow of the receiving taking place.

Consequently the index of the phasemeter may be graduated as a function of the height above the ground.

It will be evident that my invention is not limited to the use of a phasemeter provided with an index but that a cathodic oscillograph preferably a low tension oscillograph of the Western Electric type may conveniently be used, the displacements of the path of the electrons flowing in said apparatus would then be substituted for the indications given by the index.

Having now described my invention and in what manner the same is to be performed I declare that what I claim and desire to secure by Letters Patent of the United States is:—

1. A magnetic and radioelectric goniometry device comprising a phasemeter, a stator of a multiphase generator creating an auxiliary field, a two-phase tetrapolar induction rotor in this field, an exploring element for the field in observation, said element and said rotor rotating together, and means to compare in said phasemeter the relative phases of the electromotive forces generated respectively in said rotor and in the exploring element.

2. A magnetic and radioelectric goniometry device comprising an electrodynamic phasemeter, an auxiliary magnetic field, a two-phase tetropolar induction rotor in the auxiliary field, a rotary frame upon the axis of the rotor and means to compare in said phasemeter the relative phases of the electromotive force generated in the rotor and that generated in the frame carried upon the rotor.

3. A magnetic and radioelectric goniometry device comprising a phasemeter provided with two perpendicular stationary windings and with a third rotary winding provided with an index, an auxiliary electric field, a two-phase tetrapolar induction rotor in said field, a frame upon the spindle of said rotor, means to send off in both stationary windings of the phasemeter the tensions induced in the rotor and means to cause the tensions induced in the frame to pass in the rotary winding of the phasemeter by the intermediary of an amplifying detector.

4. A magnetic and radioelectric goniometry device comprising an electrodynamic phasemeter, an auxiliary electric field, a two-phase tetrapolar induction rotor in said auxiliary field, a frame on the rotor spindle, contact rings on the rotary frame and rotor spindle to collect the tensions generated in both the frame and the rotor and to send them in the phasemeter.

In testimony that I claim the foregoing as my invention, I have signed my name.

LUCIEN LEVY.